Jan. 3, 1956
O. SCHWAB
2,729,317
FRICTION DISC CLUTCHES
Filed March 14, 1951
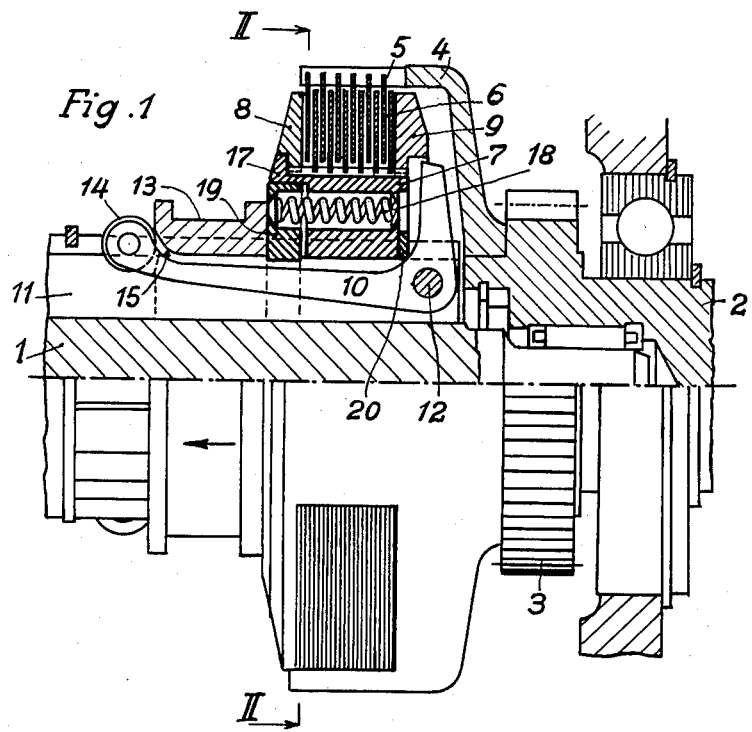
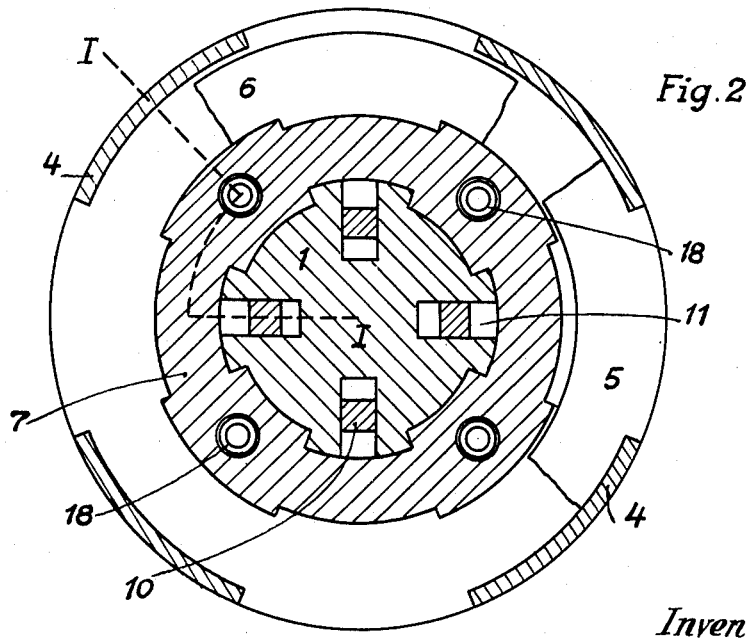
Inventor:
OTTO SCHWAB
by: Edmund H. Parry
Attorney United States Patent Office 2,729,317
Patented Jan. 3, 1956

2,729,317

FRICTION DISC CLUTCHES

Otto Schwab, Friedrichshafen, Bodensee, Germany, assignor to Zahnradfabrik Friedrichshafen, Aktiengesellschaft, Friedrichshafen, Bodensee, Germany Application March 14, 1951, Serial No. 215,509

Claims priority, application Germany June 29, 1950

3 Claims. (Cl. 192—69)

My invention relates to shiftable friction clutches with a plurality of friction discs and has especial reference to friction disc clutches of the type in which the friction discs are pressed together by means of a coupling sleeve.

Hitherto in such clutches the particular means for operating them are made with resilient levers or like parts. In this case the springs have to be in totally slack condition when the clutch is disengaged so that for the friction discs the necessary play in idle run condition of the clutch is available. Therefore it was necessary to make use of exceedingly hard springs because otherwise the coupling path would be too long. When engaging the clutch the springs have to be tensioned from their slackest condition to the condition of developing full coupling pressure. This requires at one hand considerable coupling forces and on the other hand the coupling pressure lessens soon with gradual wear of the clutch discs so that special adjusting means are necessary. The adjustment was only possible after total dismounting of the clutch. Under these circumstances clutches of the aforesaid type can never be used in coupling devices for changing the speed in change speed gears of power driven vehicles.

My invention differs from the hitherto known shiftable friction disc clutches by the following advantageous characteristics.

In the range of the pressure action of the clutch parts a special spring arrangement is provided which consists of extra-ordinarily soft acting springs (i. e. with a flat line of characteristic), which are to be inserted in a pretensioned condition. In friction disc clutches improved in this manner the clutch discs will be closed up together without considerable exertion of force. Only in the last moment when the force for compressing the series of clutch discs has nearly reached its highest state, the soft springs will act and the final compression of the clutch takes place. Since in the improved friction disc clutch every kind of adjustment is avoided, the clutch will work without disturbances for many years. This result is warranted by the soft yielding action of the springs and even after wear of the clutch discs the diminution of pressure remains at a low degree. Another feature consists in that the friction disc clutch may be dimensioned profitably small in its outer diameter. In view of this advantage and of the fact that practically a uniform coupling path is attainable my improved friction disc clutch is with advantage applicable in change speed gears in motorcars etc. Here the means for operating the clutch may be of any kind. For instance there may be provided a plurality of swingable bell crank levers, arranged symmetrically to the axis of the clutch, adapted to be operated by means of a slip ring or sleeve. In another operating device the pressure disc of the friction disc clutch may be influenced by balls and by aid of a conical surface of the slip ring or sleeve. Still another operating device may consist in a spreadable spider piece serving for compressing the package of clutch discs.

Having given a general description of my invention I now want to point it out more in detail referring to the drawings which represent an example embodying my invention.

Fig. 1 shows the friction disc clutch in a longitudinal section along line I—I of Fig. 2.

Fig. 2 is a cross section along line II—II of Fig. 1.

1 and 2 designate the driving and the driven shafts, respectively. To shaft 2 which carries a toothed gear 3 a cylindrical cover piece 4 is connected guiding the outer clutch discs 5. The inner friction discs 6 are guided in an annular part 7 which is adapted to slide on the splined part of the shaft 1. For compressing the series of clutch discs a plurality of bell crank levers 10 are arranged, each of them is pivoted in a bolt 12 provided in a longitudinal groove of shaft 1. Each lever bears with its one arm against the pressure disc 9, while its other arm terminates in a roller 14 bearing against the slip ring 13. The slip ring 13 forms a conical annular surface 15 with which it may be forced against all of the rollers 14 and levers 10, respectively, if the slip ring 13 is moved in the direction of the arrow shown in Fig. 1, whereby the series of the friction discs will be pressed against each other. The spring arrangement in accordance to my invention may for instance consist in that in bore holes of the annular part 7 a plurality of compression springs 18, for instance spiral springs, are placed. These springs are resting against a collar 19 which is undisplaceably fixed to shaft 1. All springs are to be brought in place in a pretensioned condition, so that they tend to shift the annular part 7 against a collar 20 which is also undisplaceably fixed to shaft 1. The annular part 7 has an outer collar 17, the inner ring surface of which serves as a shoulder for abutting the end-disc 8.

If by means of the bell crank levers 10 the series of clutch discs is compressed and also pressed against the limiting clutch disc 8, the annular part 7 gives way under compression of the springs 18 as soon as the final action of the clutch pressure takes place whereby the clutch pressure does not increase to a value worth to be mentioned. As now the ability of resistency of the long arms of the bell crank levers may be disregarded or abandoned and therefore these levers may be constructed essentially stronger and shorter whereby the length of the clutch will be diminished.

I do not want to limit myself to the details described or shown in the drawings as many variations will occur to those skilled in the art.

What I claim is:

1. In a friction clutch having a plurality of friction discs in which in the range of the pressure action of the clutch parts pre-tensioned soft acting springs are inserted, the combination of: an annular part slidably mounted upon and mating with a splined part of one of the coupling shafts and disposed internally of said plurality of discs and concentric therewith, said annular part abuting said springs at one end; two collars fixed to said coupling shaft for limiting the longitudinal movement of the aforementioned annular part and holding said springs in their pretensioned condition independently of said friction discs; said annular part also including a shoulder for abutting the end disc of the clutch, said shoulder being adapted to cause movement of said annular part to act on said springs.

2. In a friction clutch having a plurality of friction discs in which in the range of the pressure action of the clutch parts pre-tensioned soft acting springs are inserted, the combination of: an annular part slidably mounted upon and mating with a splined part of one of the coupling shafts and disposed internally of said plurality of discs and concentric therewith, said annular part abuting said springs at one end; two collars fixed to said coupling shaft for limiting the longitudinal path of the aforementioned annular part and holding said springs in their pretensioned condition independently of said friction discs; said annular part including a shoulder for abuting the end-disc of the clutch, said shoulder being adapted to cause movement of said annular part to act on said springs; said annular part also being adapted to receive the inner friction discs of the clutch.

3. In a friction clutch having a plurality of friction discs in combination: clutch parts having especially soft acting compression springs in the range of the pressure action of the clutch; said compression springs being inserted in pre-tensioned condition; an annular part slidably mounted upon and mating with a splined part of one of the coupling shafts and disposed internally of said plurality of discs and concentric therewith; said annular part having a plurality of bore holes receiving said compression springs; two collars fixed to the aforementioned coupling shaft for limiting the longitudinal movement of said annular part and holding said springs in their pretensioned condition independently of said friction discs; said annular part also including a shoulder for abutting the end disc of the clutch, said shoulder being adapted to cause movement of said annular part to act on said springs.

References Cited in the file of this patent

UNITED STATES PATENTS

| | | |
|---|---|---|
| 1,632,526 | Willgoos | June 14, 1927 |
| 1,958,070 | Schmid et al. | May 8, 1934 |
| 2,593,521 | Ball | Apr. 22, 1952 |
| 2,639,013 | Meschia | May 19, 1953 |

FOREIGN PATENTS

| | | |
|---|---|---|
| 92,693 | Germany | May 25, 1923 |
| 651,815 | Germany | Oct. 20, 1937 |
| 885,445 | France | May 24, 1943 |
| 908,979 | France | Nov. 12, 1945 |
| 924,404 | France | Mar. 10, 1947 |